United States Patent [19]

Ikeda

[11] Patent Number: 5,608,422
[45] Date of Patent: Mar. 4, 1997

[54] AUTOMATIC CONTRAST ADJUSTING DEVICE

[75] Inventor: Yoshitaka Ikeda, Ora-gun, Japan

[73] Assignee: Sanyo Electric Co., Ltd., Osaka, Japan

[21] Appl. No.: 157,718

[22] Filed: Nov. 24, 1993

[30] Foreign Application Priority Data

Nov. 27, 1992 [JP] Japan .................... 4-318567

[51] Int. Cl.⁶ .................................... G09G 3/18
[52] U.S. Cl. ................ 345/101; 345/98; 349/161
[58] Field of Search ................ 345/92, 89, 101, 345/117, 3, 213, 185, 102, 98; 359/56, 86, 55

[56] References Cited

U.S. PATENT DOCUMENTS

| | | | |
|---|---|---|---|
| 4,799,072 | 1/1989 | Akimoto et al. | 354/76 |
| 4,923,285 | 5/1990 | Ogino et al. | |
| 5,027,111 | 6/1991 | Davis et al. | |
| 5,138,305 | 8/1992 | Tomiyasu | 345/3 |
| 5,206,633 | 4/1993 | Zalph | 345/117 |
| 5,245,326 | 9/1993 | Zalph | 345/117 |

FOREIGN PATENT DOCUMENTS

| | | |
|---|---|---|
| 0438093 | 7/1991 | European Pat. Off. . |
| 2673027 | 8/1992 | France . |
| 63-149169 | 6/1988 | Japan . |
| 01172820 | 7/1989 | Japan ................ 345/101 |
| 3009408 | 1/1991 | Japan . |
| 3096918 | 4/1991 | Japan . |
| 4005623 | 1/1992 | Japan . |
| 5127644 | 5/1993 | Japan . |
| 5127609 | 5/1993 | Japan . |

Primary Examiner—Richard Hjerpe
Assistant Examiner—Lun-Yi Lao
Attorney, Agent, or Firm—Loeb & Loeb LLP

[57] ABSTRACT

An automatic contrast adjusting device which is capable of providing an optimum LCD contrast for a user's eyes as the user desires. A CPU references a characteristic table listing temperatures vs. liquid crystal drive voltages in a RAM in response to temperature data from a thermistor, reads a PWM value (liquid crystal drive voltage) corresponding to the temperature data, and outputs a PWM pulse of a duty ratio corresponding thereto. On the other hand, when the user manually adjusts the contrast by handling a contrast switch, characteristic data in the RAM is corrected in response to the adjustment amount, and is then written into an EEPROM.

16 Claims, 9 Drawing Sheets

AUTOMATIC CONTRAST ADJUSTING DEVICE

BACKGROUND OF THE INVENTION

1. Field of the Invention

This invention relates to a liquid crystal display device and more particularly to a device which is capable of automatically adjusting a contrast of a liquid crystal display screen.

2. Description of the Related Art

From the viewpoints of miniaturization and power saving, a liquid crystal display (LCD) is adopted as a display in many information processors such as personal computers. Generally, the LCD is provided with a contrast control, which can be handled manually by the user to adjust the contrast of the screen as desired.

However, usually the brightness of the LCD will be dark at low temperatures and light at high temperatures, thus the user must handle the contrast control to adjust the contrast as temperature rises while the LCD is operating.

To solve such a problem, it is also possible to automatically adjust the contrast in response to a temperature. However, whether or not the contrast is optimum varies from one person to another, and if it is adjusted according to a specific adjustment rule, namely, a temperature vs. drive voltage characteristic, the contrast cannot necessarily be adjusted so that it becomes optimum for every user. LCDs vary in characteristics to some degree depending on manufacture, and differ in contrast even at the same drive voltage; they do not include means capable of solving such inconvenience.

SUMMARY OF THE INVENTION

Accordingly, it is an object of the invention to provide an automatic contrast adjusting device which is capable of providing an optimum LCD contrast for a user's eyes as the user desires.

To the end, according to one embodiment of the invention, there is provided, in a liquid crystal display for displaying various pieces of information at a contrast in response to a given drive voltage, a device for automatically adjusting the contrast comprising means for storing a characteristic table in which operating temperatures and drive voltages are related to each other, an operation switch for setting a drive voltage of the liquid crystal display, characteristic correction means being responsive to the drive voltage set through the operation switch for correcting the contents of the characteristic table, means for measuring the temperature of the liquid crystal display, and liquid crystal drive means being responsive to the temperature data provided by the temperature measurement means for reading a drive voltage corresponding thereto from the characteristic table and supplying the drive voltage to the liquid crystal display.

In the invention, the characteristic table contents are corrected in response to the adjustment amount manually entered through the contrast switch, and after this, the contrast of the liquid crystal panel is automatically adjusted based on the characteristic table.

The characteristic correction means may be responsive to the difference between a value set through the operation switch and a value set preceding the setting for changing the temperature range in which the contents of the characteristic table are to be corrected.

In the invention, the correction amount in another temperature zone in a characteristic table changes in response to the adjustment amount entered manually.

The characteristic correction means can correct characteristic data only when an entry is not made again through the operation switch within a predetermined time after an entry through the operation switch terminates.

In the invention, the characteristic table is not corrected until a predetermined time elapses after the user ends handling of the contrast switch.

The automatic contrast adjusting device may further include means for determining the liquid crystal display type, wherein the characteristic table in the storage means is provided for each liquid crystal display type and in response to the determination result of the determination means, the characteristic table corresponding to the determined liquid crystal display type is used.

In the invention, the contrast is adjusted in response to the liquid crystal panel type.

According to another embodiment of the invention, there is provided, in a liquid crystal display for displaying various pieces of information at a contrast in response to a given drive voltage, a device for automatically adjusting the contrast comprising means for storing a characteristic table in which operating temperatures and drive voltages are related to each other, means for measuring temperature of the liquid crystal display, means being responsive to the temperature data provided by the temperature measurement means for reading the drive voltage corresponding thereto from the characteristic table, and drive voltage output means being responsive to the difference between the drive voltage read by the read means and the preceding drive voltage for changing the change width of drive voltage supplied to the liquid crystal display and outputting the drive voltage.

In the invention, the contrast is adjusted in response to the scale of the temperature change amount.

DESCRIPTION OF THE PREFERRED EMBODIMENTS

Referring now to the accompanying drawings, there are shown preferred embodiments of the invention.

Figure 1:
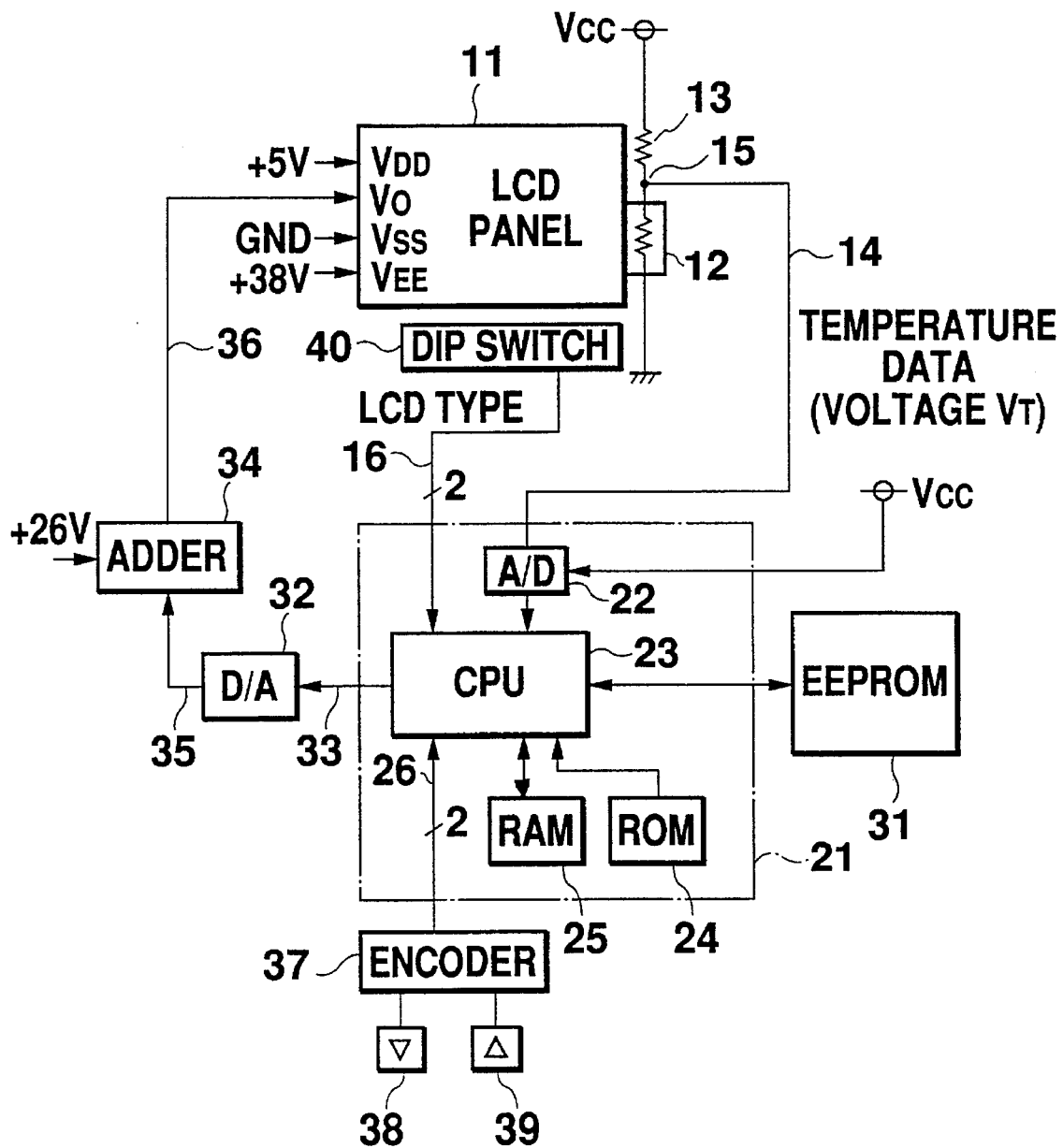
FIG. 1 is a block diagram showing an automatic contrast adjusting device according to one embodiment of the invention.
Figure 2:
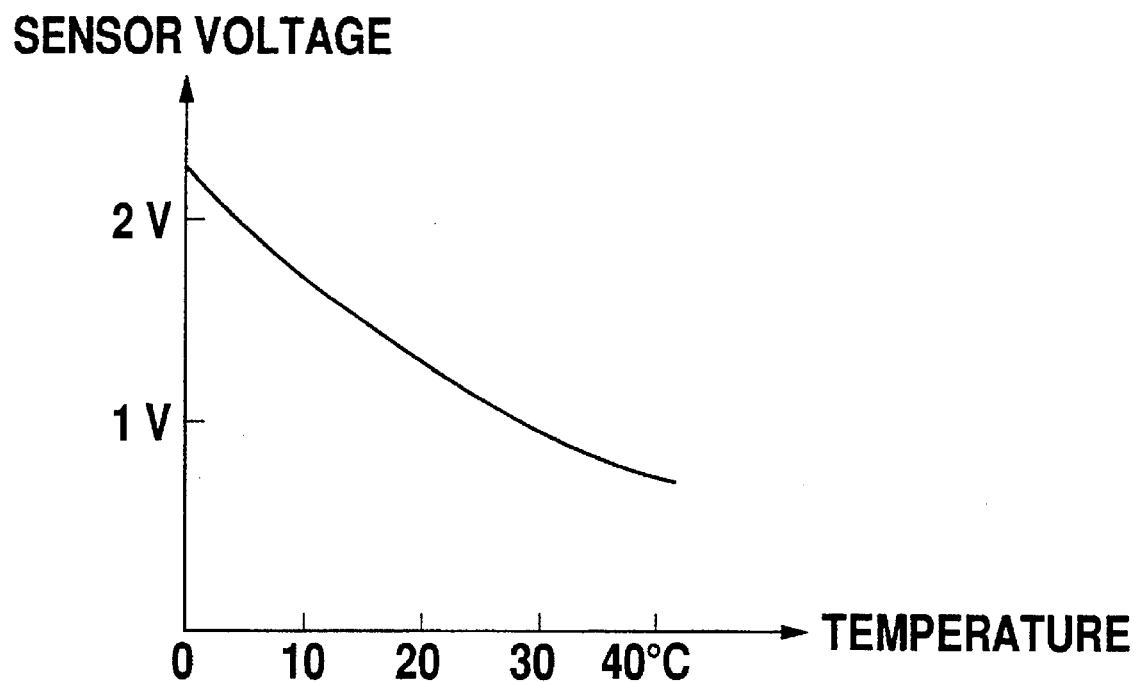
FIG. 2 is a graph showing a temperature characteristic of a thermistor shown in FIG. 1.

FIG. 1 shows an automatic contrast adjusting device and a liquid crystal display panel according to one embodiment of the invention, wherein an LCD panel 11 is provided with four control terminals $V_{DD}$, $V_{EE}$, $V_{SS}$, and $V_0$ to which +5 V, +38 V, GND, and liquid crystal drive voltage (26–38 V) are supplied respectively. Various pieces of information are displayed at the contrast corresponding to the liquid crystal drive voltage $V_0$. A thermistor, one end of which is grounded and the other end of which is connected via a resistor 13 to a power supply $V_{CC}$, is fixed to one side of the LCD panel 11. The resistance value of the thermistor 12 decreases or increases in response to the rise or fall of the temperature at the installation point, and potential $V_T$ at one end 15, which will be hereinafter referred to as sensor voltage $V_T$, decreases as the temperature rises, as shown in FIG. 2. The sensor voltage $V_T$ is converted into a digital value by an analog-to-digital (A/D) converter 22 in a contrast control section 21 and the digital value is input to a central processing unit (CPU) 23.

A DIP switch 40 is also provided for outputting information indicating the LCD type such as STN monochrome or STN color, and the LCD type information 16 is read into the CPU 23 as 2-bit information when the LCD is first started after production.

Figure 3:
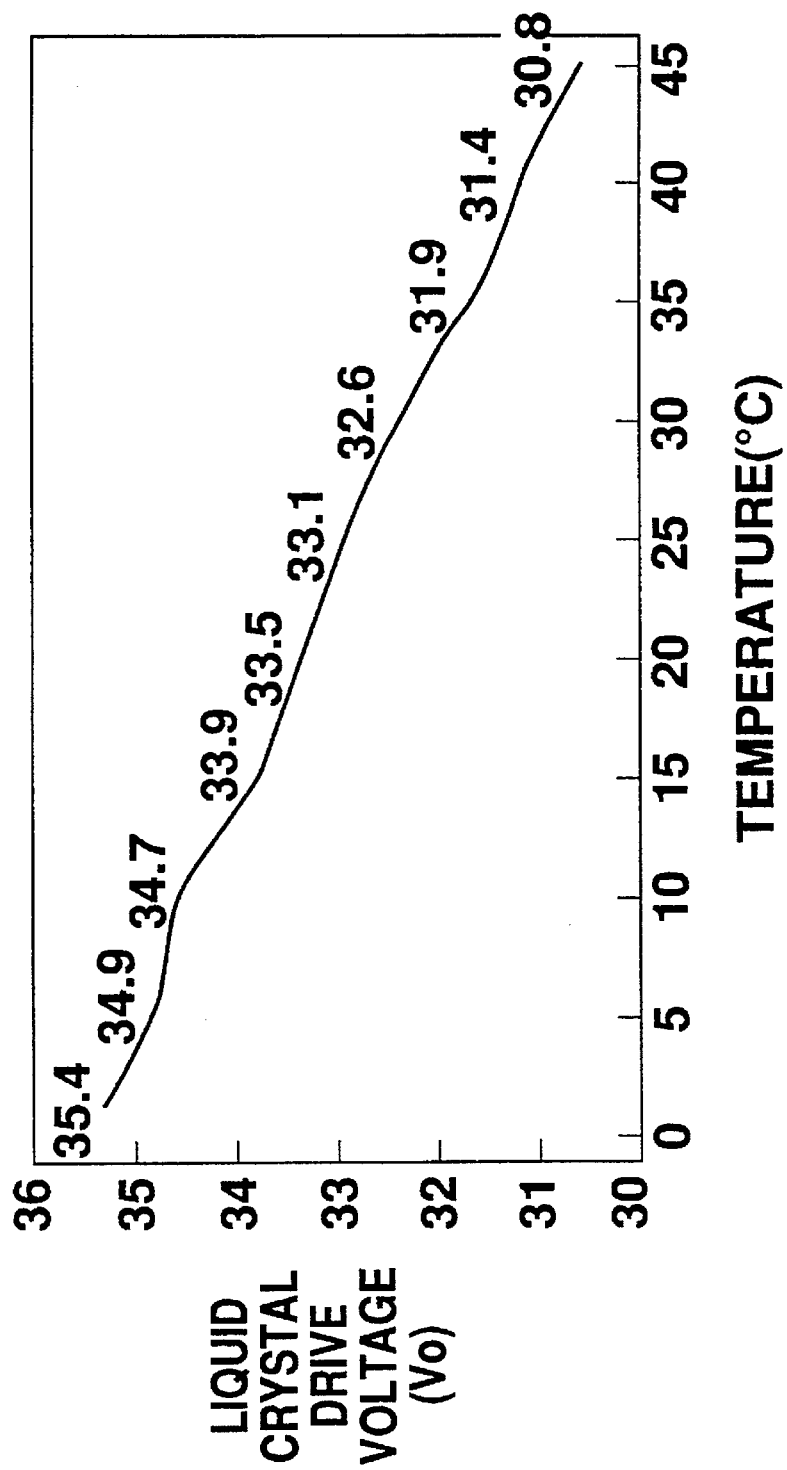
FIG. 3 is a graph showing the contents of a characteristic table stored in ROM in FIG. 1.

A read-only memory (ROM) 24 and a random access memory (RAM) 25 are located in the contrast control section 21; the former stores a characteristic table showing the basic characteristic of temperature vs. liquid crystal drive voltage $V_0$ as shown in FIG. 3 for each LCD type. In fact, the characteristic table is a table in which the sensor voltages $V_T$ corresponding to the temperature data are related to the PWM (pulse width modulation) values corresponding to the liquid crystal drive voltages, and is copied into the RAM 25 or an electrically erasable programmable read-only memory (EEPROM) 31 located outside the contrast control section, as required.

Figure 4A:
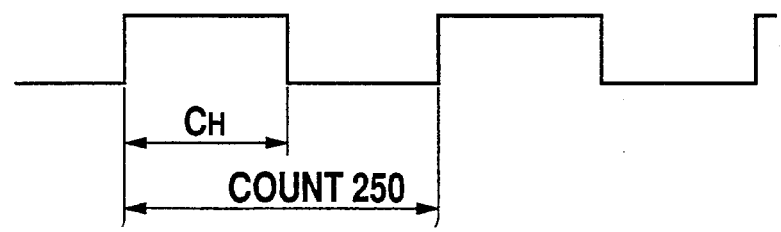
FIG. 4A–4D are illustrations showing waveforms of PWM pulses output from CPU in FIG. 1.
Figure 4B:
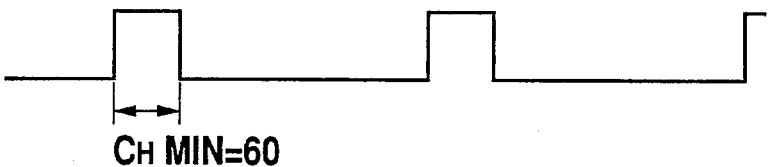
Figure 4C:
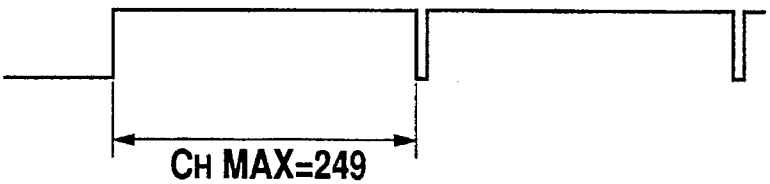

The CPU 23 references the characteristic table in the RAM 25 based on the sensor voltage $V_T$ from the thermistor 12 and reads its corresponding PWM value from the table for outputting the value. This PWM value is a value indicating the count of the high period of PWM pulse 33 of frequency 1 kHz output from the CPU 23, $C_H$ (FIG. 4A); as the sensor voltage $V_T$ decreases, namely, the temperature rises, $C_H$ will decrease. One cycle of the PWM pulse 33 is related to count 250. Count $C_H$ can take a value ranging from 60 to 249, as shown in FIG. 4B and 4C.

PWM pulse 33 from the CPU 23 is converted into an analog voltage by a digital-to-analog (D/A) converter and the analog voltage and the reference voltage (+26 V), which is the MIN value of liquid crystal drive voltage, are added by an analog adder 34. The result of this addition is supplied to the LCD panel 11 as liquid crystal drive voltage $V_0$.

Figure 4D:
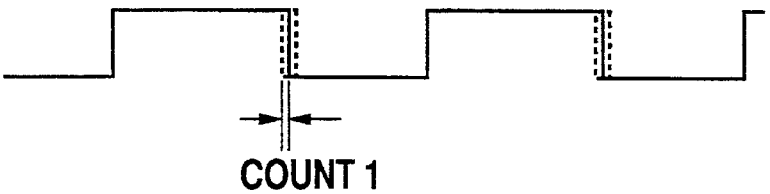

Contrast switches 38 and 39 are connected via an encoder 37 to the contrast control section 21. The user can change the duty ratio of the PWM pulse 33 from the CPU 23 for changing the liquid crystal drive voltage $V_0$, as shown in FIG. 4D, by manually depressing the contrast switch 38 or 39 either by one shot or continuously. Here, the contrast switch 38 is used to increase the liquid crystal drive voltage $V_0$ for making the contrast bright; the contrast switch 39 is used to decrease the liquid crystal drive voltage $V_0$ for making the contrast dark.

The operation of the automatic contrast adjusting device described above is discussed in conjunction with FIGS. 5 to 7.

Figure 5:
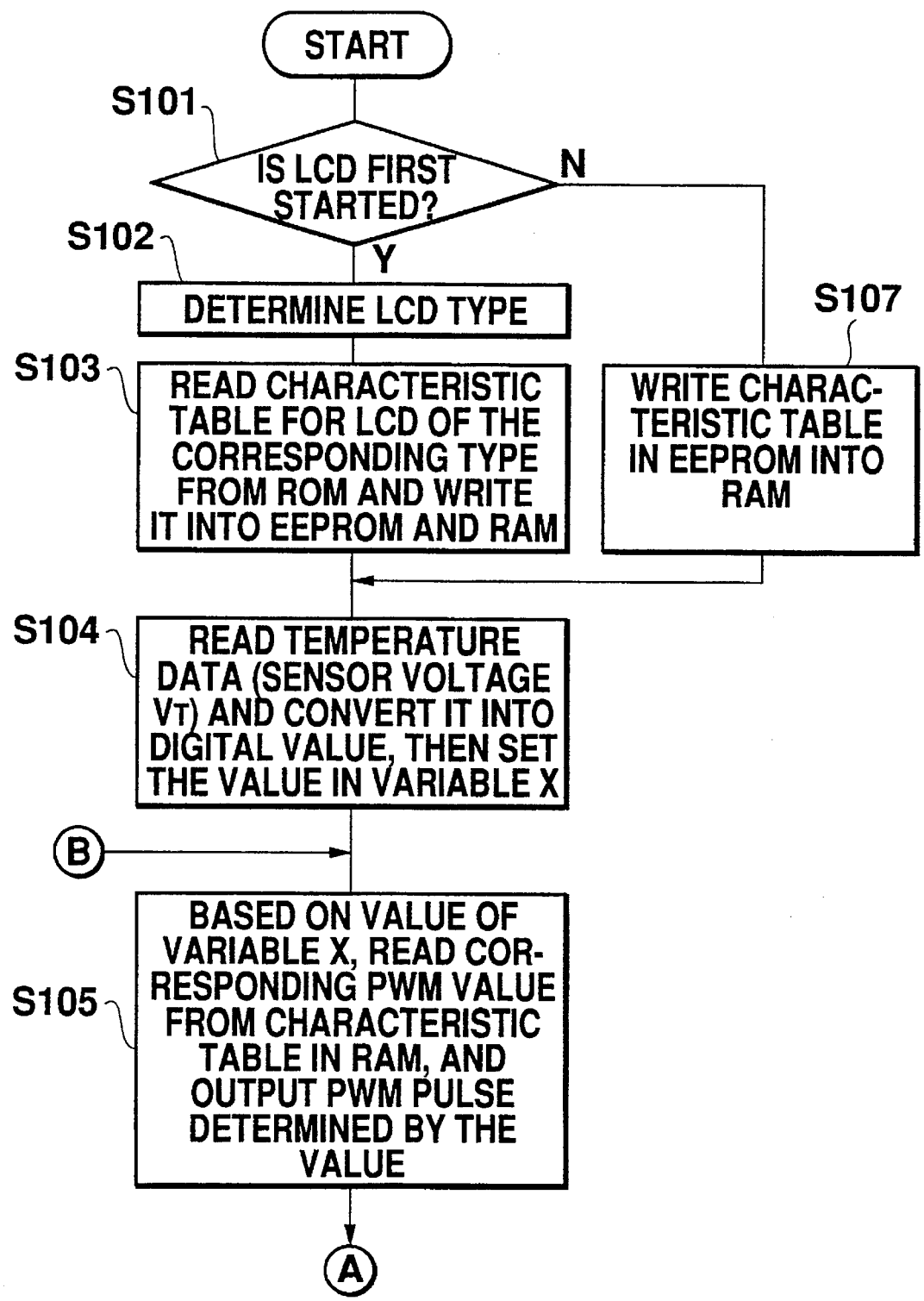
FIG. 5 is a flowchart showing how the CPU performs processing in the automatic contrast adjusting device in FIG. 1.

When the user turns on a power switch (not shown), if the LCD is first started after production (step S101 in FIG. 5; Y), the CPU 23 reads LCD type information 16 from the DIP switch 40, determines the LCD type at step S102, and reads the characteristic table for the corresponding LCD from the ROM 24, then writes the table into the EEPROM 31 and the RAM 25 at step S103. On the other hand, if it is not the first time the LCD has been started after production (step S101; N), the CPU 23 reads the characteristic table for the LCD in the EEPROM 31 and writes it into the RAM 25 at step S107.

The revision together with the default value of the characteristic table is stored in the ROM and they are written into the EEPROM 31. Therefore, whether or not the LCD is first started after production can be determined by determining whether or not the revision stored in the ROM matches that in the EEPROM.

Next, the CPU 23 reads sensor voltage $V_T$ from the thermistor 12 and converts it into a digital value, then sets the value in variable X at step S104. Based on the value of the variable X, the CPU references the characteristic table in the RAM 25 for reading the corresponding PWM value, and outputs the PWM pulse 33 determined by the PWM value at step S105. The PWM pulse 33 is converted into an analog voltage by the D/A converter 32 and the reference voltage (+26 V) is added to the analog voltage by the adder 34, then the result is used as the liquid crystal drive voltage $V_0$ of the LCD panel 11.

Figure 6:
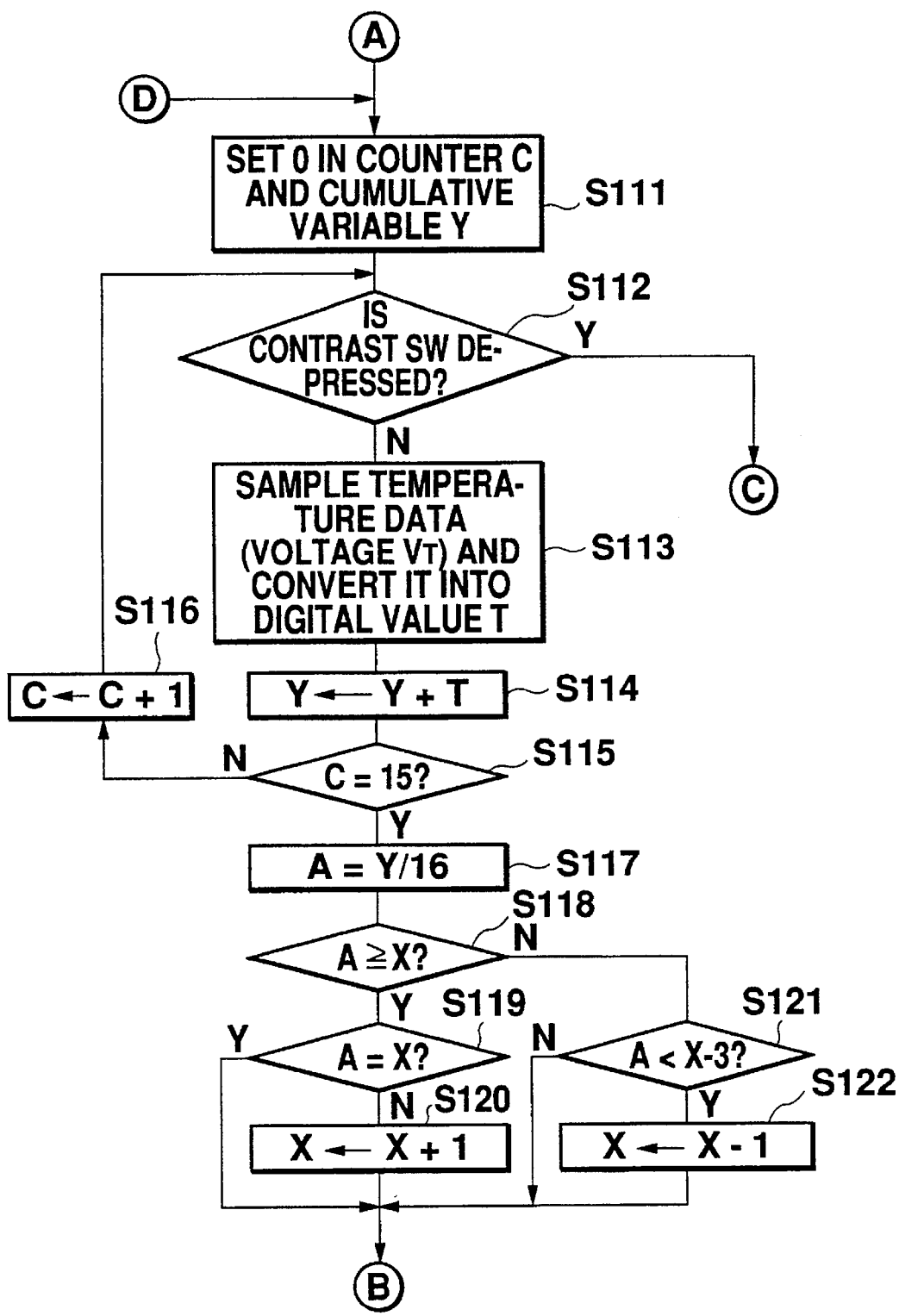
FIG. 6 is a flowchart showing how the CPU performs processing in the automatic contrast adjusting device in FIG. 1.

Next, the CPU 23 sets 0 in counter C and cumulative variable Y at step S111 in FIG. 6, then samples a total of 16 temperature data values (sensor voltages $V_T$) over four seconds four times a second and averages them at steps S113 to S117 that follow. That is, first whether or not the contrast switch 38 or 39 is depressed is checked at step S112, and if it is not depressed (step S112; N), one sensor voltage $V_T$ is sampled and is converted into a digital value T at step S113. The digital value T is added to the cumulative variable Y at step S114. If the counter C does not reach 15 (step S115; N), C is incremented by one at step S116 and control returns to step S112. After this, the process is repeated to total up the 16 data values until the counter C reaches 15 (step S115; Y). Then, their average value A is found at step S117.

Next, the average value A thus found is compared with the variable X corresponding to the preceding PWM value. When A is greater than X, that is, when the current temperature falls below the preceding temperature (step S118; Y, step S119; N), X is incremented by one; when A is equal to X (step S118; Y, step S119; Y), X remains unchanged. On the other hand, when A is less than X (step S118; N), further A is compared with (X–3), and the X value is changed in response to the comparison result. That is, when A is less than (X–3) (step S121; Y), X is decremented by one; otherwise (step S121; N), the X value remains unchanged. Based on the value of the variable X, the CPU 23 references the characteristic table in the RAM 25 for reading the corresponding PWM value, and outputs the PWM pulse 33 determined by the PWM value at step S105.

Even if the difference between the preceding temperature data and the current temperature data changes greatly, the value of the variable X (sensor voltage $V_T$), when the characteristic table is referenced, changes one at a time and the liquid crystal drive voltage $V_0$ also changes the minimum step at a time by executing steps S118 to S122. Particularly, when temperature rises and the sensor voltage $V_T$ decreases, the liquid crystal drive voltage $V_0$ is not changed unless the sensor voltage $V_T$ decreases by 3 or greater. This can efficiently suppress contrast fluctuation caused by automatic adjustment when temperature changes greatly. Although the value of the sensor voltage $V_T$, temperature data is corrected in the example given above, of course, the PWM value obtained by referencing the characteristic table may also be incremented or decremented for correction, thereby producing a similar effect.

When depressing of the contrast switch is detected (step S112 in FIG. 6; Y), the manual input value through the contrast switch is read at step S131 in FIG. 7 and the PWM value at the time is corrected in response to the manual input value at step S132. Specifically, as shown in FIG. 4D, each time the contrast switch 38 is depressed, the count $C_H$ of the high period of the PWM pulse 33 is incremented by one for increasing the liquid crystal drive voltage $V_0$, making display on the LCD panel 11 bright. In contrast, each time the contrast switch 39 is depressed, the count $C_H$ is decremented by one for decreasing the liquid crystal drive voltage $V_0$, making display on the LCD panel 11 dark. When the user continues to depress the contrast switch 38 or 39, the CPU 23 performs polling every given period until the user releases the contrast switch (step S133; Y), and changes the count $C_H$ one at a time up to the first count 4, two at a time up to the count 8, then four at a time.

Next, when the CPU 23 detects the user releasing the contrast switch 38 or 39 (step S133; Y), it resets a timer at step S134. If the switch is not depressed again before the elapse of five seconds (step S135; N, step S136; N, step S135; Y), the CPU 23 corrects the characteristic table in the RAM 25, as described below, at step S138 in response to the PWM value obtained at step S132, and writes the table into the EEPROM 31 at step S139, then returns to step S111. On the other hand, if the switch is depressed again within five seconds after the contrast switch being off is detected (step S136; Y), the CPU 23 resets the timer at step S137 and returns to step S111.

Thus, even if the user handles the contrast switches in a manner of trial and error for manual adjustment, the characteristic table is not corrected until the final contrast state is set; thus the life of an EEPROM whose rewrite count is limited can be prolonged.

Figure 7:
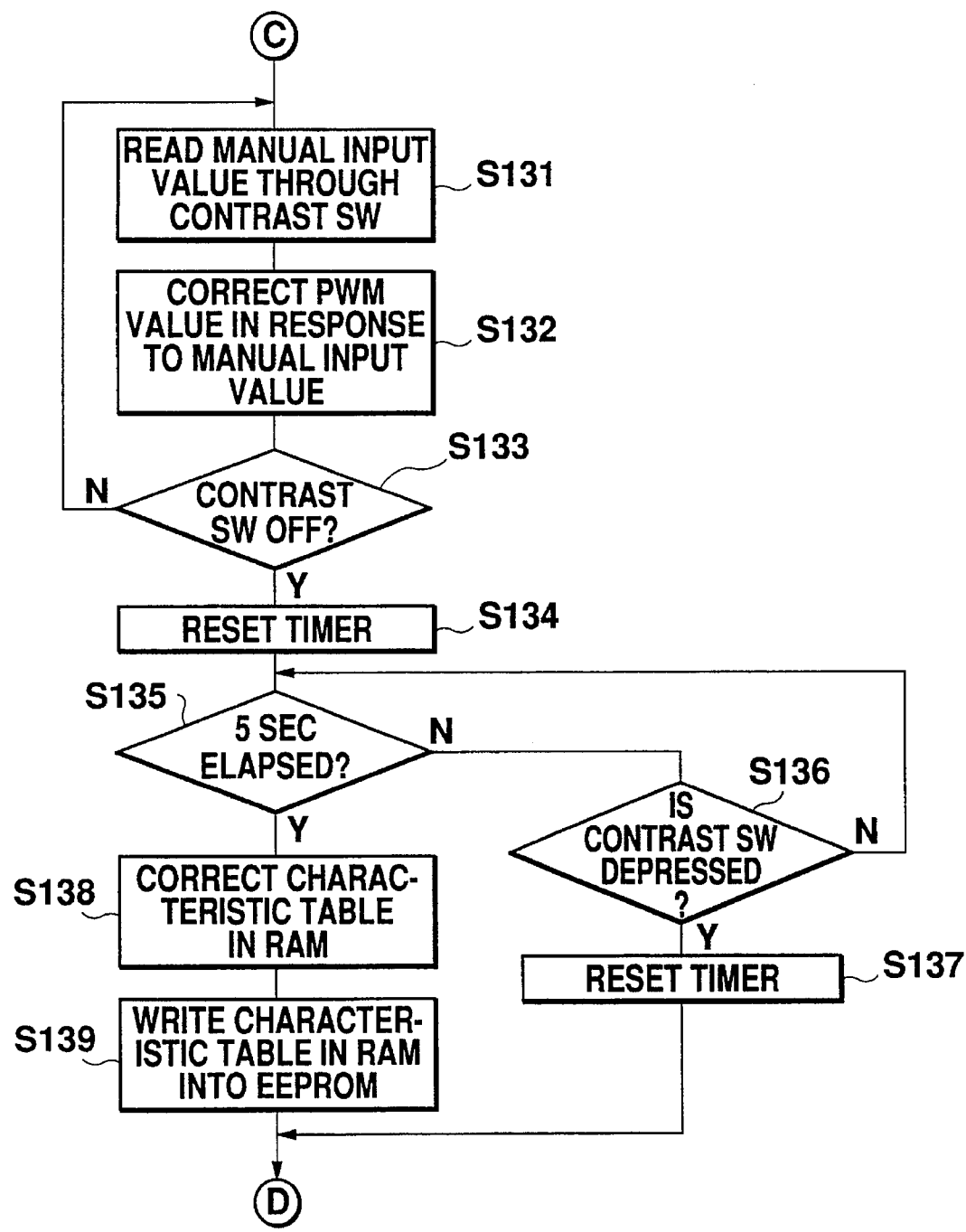
FIG. 7 is a flowchart showing how the CPU performs processing in the automatic contrast adjusting device in FIG. 1.
Figure 8:
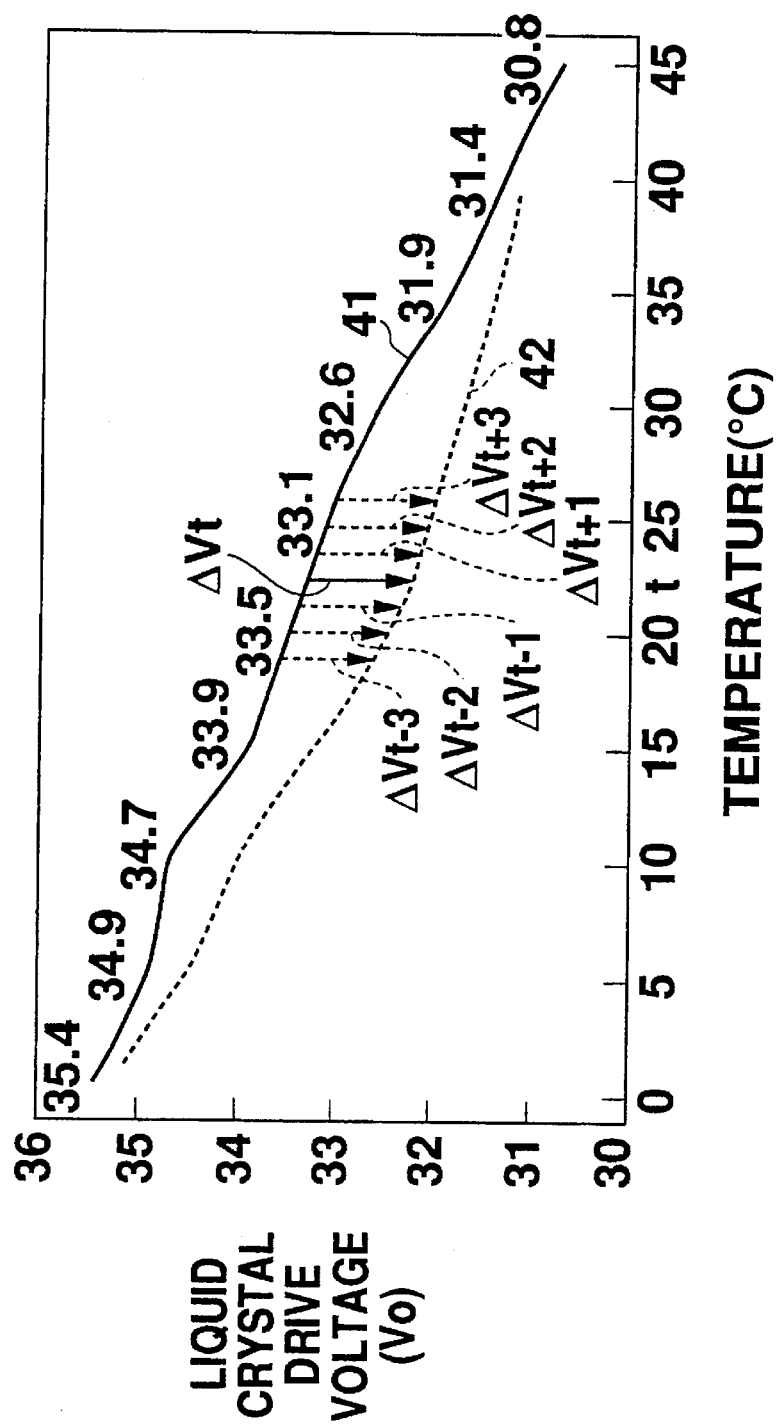
FIG. 8 is a graph for describing a correction method of a characteristic table.

Next, the correction method of the characteristic table at step S138 in FIG. 7 is described in conjunction with FIG. 8.

Now, assume that the initial characteristic table lists a characteristic as indicated by a solid line 41 in FIG. 8 and that the current temperature is t. Assuming that the user handles the contrast switch 39 to lower the liquid crystal drive voltage $V_0$ by $\Delta V_t$, the correction amount $\Delta V$ for the liquid crystal voltage at temperatures (t−n−1) and (t+n+1) on both sides is calculated by the following expression (1):

$$\Delta V_{t-n-1} = \Delta V_{t+n+1} = \Delta V_{t+n} - \alpha \Delta V_t \quad (1)$$

It should be noted that n=0, 1, 2, ... where α is a constant indicating the temperature range in which correction is to be made, namely, indicating how much correction at one temperature affects another temperature zone. The constant α is written in the EEPROM and its value can be changed.

In the above expression (1), by calculating the correction amount $\Delta V_{t-n-1}$ for the liquid crystal drive voltage at temperature (t−n−1) and the correction amount $\Delta V_{t+n+1}$ at temperature (t+n+1) while sequentially incrementing the value n in the manner 0, 1, 2, ..., the following expressions are obtained.

$$n=0: \Delta V_{t-1} = \Delta V_{t+1} = \Delta V_t - \alpha \Delta V_t \quad (2)$$

$$n=1: \Delta V_{t-2} = \Delta V_{t+2} = \Delta V_{t+1} - 2\alpha \Delta V_t \quad (3)$$

$$n=2: \Delta V_{t-3} = \Delta V_{t+3} = \Delta V_{t+2} - 3\alpha \Delta V_t \quad (4)$$

Then, the characteristic curve data (temperature to drive voltage) on the characteristic table is sequentially changed into data obtained from the above expressions (2), (3) ... These processing steps are continued until the newly generated characteristic curve crosses the initial characteristic curve, thereby changing not only the adjacent (i.e. both sides) correction amount ($\Delta V_{t-1}$, $\Delta V_{t+1}$) of the liquid crystal voltage, but a also broader range of correction amount, when the user changes the liquid crystal drive voltage at a temperature t by $\Delta V_t$ through the switching operation.

As is apparent from the expression (1), when "α" is set very large, influence on another temperature band on the table becomes small. On the other hand, when "α" is small the influence extends to a broader temperature band. For example, when α=0, the characteristic curve translates in parallel.

Thus, by making a correction to the characteristic table, a new characteristic data, for example, as shown by a dashed line 42 in FIG. 8, can be obtained. Furthermore, by carrying out such a manual adjustment at a plurality of temperatures, the initial characteristic table is changed to be in agreement with the characteristic of the liquid crystal panel, and is sequentially and learning-functionally corrected into a characteristic table satisfying the user's preference.

Figure 9A:
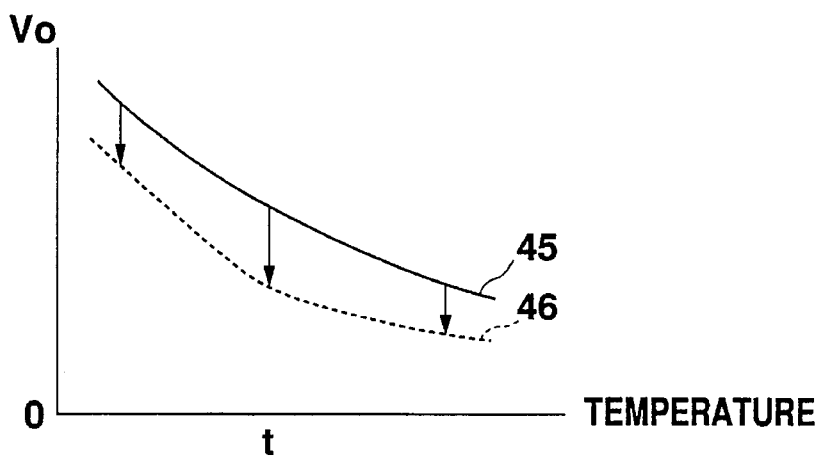
FIG. 9A and 9B are graphs for describing the correction method of the characteristic table.
Figure 9B:
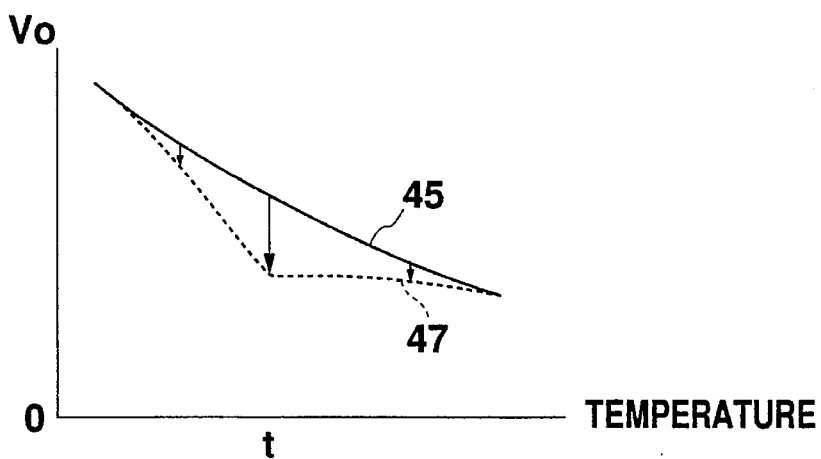

If the manual adjustment value $\Delta V_t$ is large, adjustment at one temperature greatly affects another temperature zone as indicated by a broken line 46 in FIG. 9A; if the value $\Delta_t$ is small, adjustment at one temperature affects another temperature zone to a lesser extent as indicated by a broken line 47 in FIG. 9B.

As described above, according to the invention, the characteristic table contents are corrected in response to the adjustment amount manually entered through the contrast switch, and after this, the contrast of the liquid crystal panel is automatically adjusted based on the characteristic table, thereby automatically executing the optimum contrast adjustment as desired by the user although liquid crystal display panels differ in characteristics and the optimum contrast varies depending on the user.

According to the invention, the correction amount in another temperature zone in a characteristic table changes in response to the adjustment amount entered manually.

According to the invention, since the characteristic table is not corrected until a predetermined time elapses after the user ends handling of the contrast switch, even if the user handles the contrast switch carelessly or in a manner of trial and error, only the final adjustment amount is adopted for correcting the characteristic table.

According to the invention, since contrast adjustment is made in response to the liquid crystal panel type, a contrast adjusting circuit can be made common among different types of liquid crystal displays.

According to the invention, the contrast adjustment width is changed in response to the scale of the temperature change amount, thus contrast fluctuation can be avoided.

What is claimed is:

1. In a liquid crystal display for displaying various items of information at a contrast in response to a given drive voltage, a device for automatically adjusting the contrast during operation of the liquid crystal display comprising:

means for storing a characteristic table in which operating temperatures and drive voltages are related to each other;

an operation switch for setting a drive voltage of said liquid crystal display;

characteristic correction means being responsive to the drive voltage set through said operation which for correcting contents of said characteristic table;

means for measuring temperature of said liquid crystal display; and liquid crystal drive means being responsive to temperature data provided by said temperature measurement means for reading a drive voltage corresponding thereto from said characteristic table and supplying the drive voltage to said liquid crystal display, wherein said characteristic correction means is responsive to a difference between a value set through said operation switch and a value set preceding the setting for changing a temperature range in which the contents of said characteristic table are to be corrected; and wherein, when it is assumed that the correction amount of the drive voltage set through said operation switch at temperature t is $\Delta V_t$, that the correction amounts of drive voltage at temperatures t−n−1, t+n+1 and t+n are $\Delta V_{t-n-1}$, $\Delta V_{t+n+1}$ and $\Delta V_{t+n}$, respectively, and that $\alpha$ is a constant, said characteristic correction means corrects the characteristic table so as to satisfy an expression of $\Delta V_{t-n-1} = \Delta V_{t+n+1} = \Delta V_{t+n} - \alpha/\Delta V_t$ (n=0, 1, 2, ...).

2. The device as claimed in claim 1 wherein said characteristic correction means corrects characteristic data only when an entry is not again made through said operation switch within a predetermined time after an entry through said operation switch terminates.

3. The device as claimed in claim 1 wherein one contrast switch for increasing a drive voltage and another one contrast switch for decreasing a drive voltage are provided as said operation switch and the drive voltage is related to a pulse width modulation pulse and wherein a duty ratio of the pulse width modulation pulse can be increased or decreased by depressing said contrast switches for increasing or decreasing the drive voltage in a one shot mode or continuously.

4. The device as claimed in claim 3 wherein, when said contrast switch is depressed continuously, the duty ratio of the pulse width modulation pulse is changed finely at the beginning, while it is changed coarsely as the depression time is prolonged.

5. The device as claimed in claim 1 wherein said temperature measurement means produces a sensor signal and provides a temperature measurement value of said liquid crystal display by averaging a predetermined number of sensor signal values measured at successive times by said temperature measurement means.

6. The device as claimed in claim 5 wherein the temperature measurement value is an average temperature value with respect to time.

7. The device as claimed in claim 1 wherein said temperature measurement means comprises a thermistor.

8. A device as claimed in claim 1, wherein said temperature measurement means is coupled to said liquid crystal display.

9. In a liquid crystal display for displaying various items of information at a contrast in response to a given drive voltage, a device for automatically adjusting the contrast during operation of the liquid crystal display comprising:

means for storing a characteristic table in which operating temperatures and drive voltages are related to each other;

an operation switch for setting a drive voltage of said liquid crystal display;

characteristic correction means being responsive to the drive voltage set through said operation which for correcting contents of said characteristic table;

means for measuring temperature of said liquid crystal display;

liquid crystal drive means being responsive to temperature data provided by said temperature measurement means for reading a drive voltage corresponding thereto from said characteristic table and supplying the drive voltage to said liquid crystal display, wherein said characteristic correction means is responsive to a difference between a value set through said operation switch and a value set preceding the setting for changing a temperature range in which the contents of said characteristic table are to be corrected;

means for determining a liquid crystal display type, wherein the characteristic table in said storage means is provided for each liquid crystal display type and in response to the determination result of said determination means, the characteristic table corresponding to the determined liquid crystal display type is used, wherein said storage means includes:

a read-only memory which stores the characteristic table of temperatures vs. liquid crystal display drive voltages for each liquid crystal display type and from which when said liquid crystal display is first started, the characteristic table corresponding to the liquid crystal display type is read out;

an electrically erasable programmable read-only memory which stores the characteristic table having been corrected and is read when said liquid crystal display is started at the second time or later; and a random access memory for working to store the characteristic table read from said read-only memory or said electrically erasable programmable read-only memory for correction by said characteristic correction means.

10. The device as claimed in claim 9 wherein said characteristic correction means corrects characteristic data only when an entry is not again made through said operation switch within a predetermined time after an entry through said operation switch terminates.

11. The device as claimed in claim 9 wherein a contrast switch for increasing a drive voltage and a contrast switch for decreasing a drive voltage are provided as said operation switch and the drive voltage is related to a pulse width modulation pulse and wherein a duty ratio of the pulse width modulation pulse can be increased or decreased by depressing said contrast switch for increasing or decreasing the drive voltage in a one shot mode or continuously.

12. The device as claimed in claim 11 wherein, when said contrast switch is depressed continuously, the duty ratio of the pulse width modulation pulse is changed finely at the beginning, while it is changed coarsely as the depression time is prolonged.

13. The device as claimed in claim 9 wherein said temperature measurement means produces a sensor signal and provides a temperature measurement value of said liquid crystal display by averaging a predetermined number of sensor signal values measured at successive times by said temperature measurement means.

14. The device as claimed in claim 9 wherein said temperature measurement means comprises a thermistor.

15. A device as claimed in claim 9, wherein said temperature measurement means is coupled to said liquid crystal display.

16. The device as claimed in claim 13 wherein the temperature measurement value is an average temperature value with respect to time.

* * * * *